Patented Sept. 26, 1939

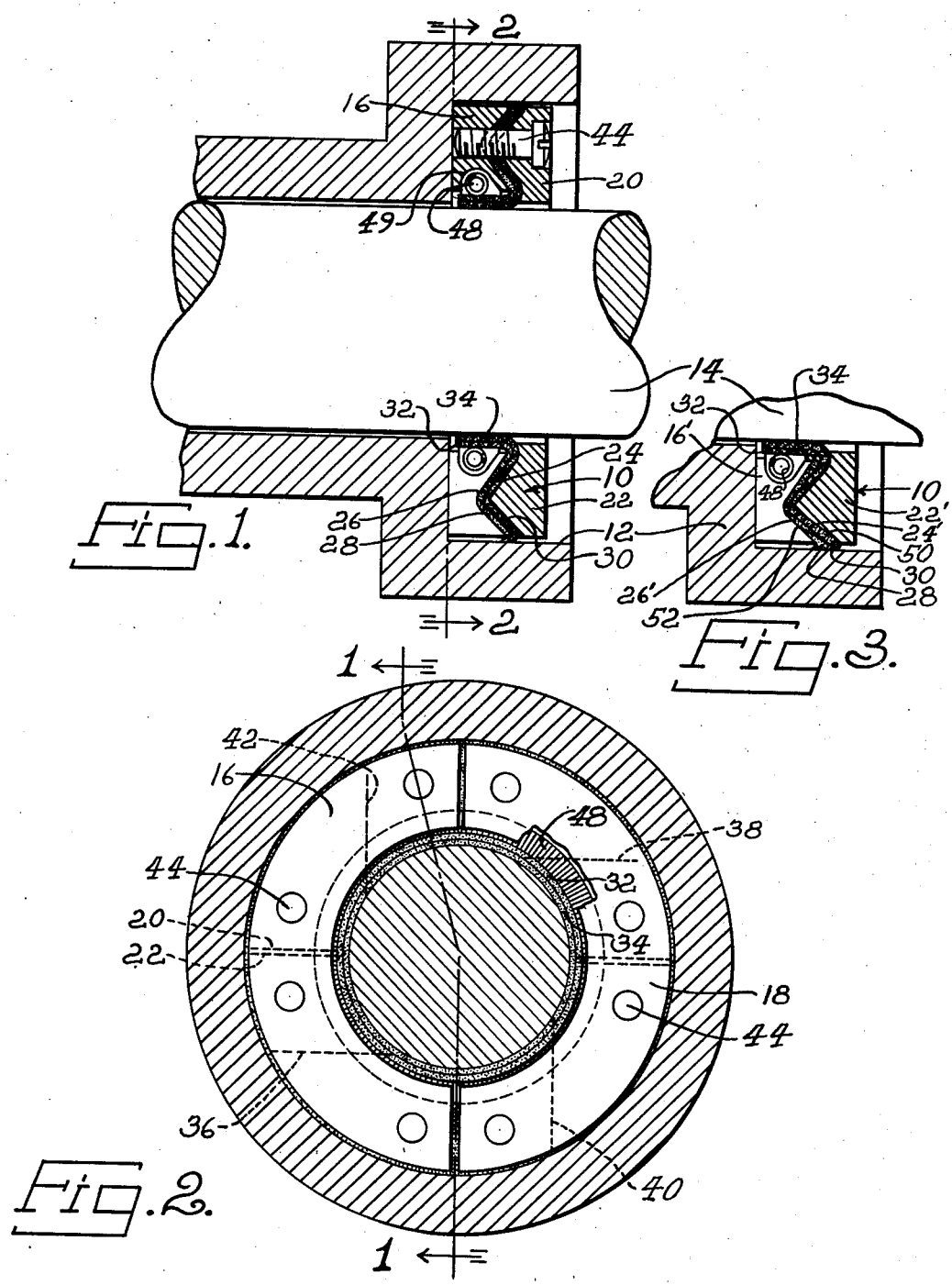

2,174,075

UNITED STATES PATENT OFFICE 2,174,075

OIL SEAL

Walter M. Borchardt, Detroit, Mich.

Application August 14, 1937, Serial No. 159,107

2 Claims. (Cl. 288—3)

This invention relates to an oil seal and more particularly to a seal adapted to be inserted in a housing in encompassing relation to a centrally located rotatable shaft.

An object of the invention is the provision of an improved seal which will give an effective and efficient sealing action at all points where fluid might otherwise escape from the chamber therefor and which will also exclude foreign matter from the fluid chamber.

Another object of the invention is to provide a seal that can be inserted as an assembled unit as aforesaid and which can also be assembled within the housing when the associated shaft is in assembled position relative to the latter.

In carrying out the objects of the invention and particularly the provision of a seal that can be applied to a shaft when the latter is assembled within its housing, I preferably form the seal from inner and outer ring members and an intermediate sealing means, each ring member being formed in sections and the sealing means being severed for relative separation to accommodate assembly within the housing in encompassing relation to the centrally located shaft. The sections of the outer ring member circumferentially overlap the sections of the inner ring member to prevent leakage of lubricant through the seal and as a further precaution in this direction the point at which the sealing means is severed is also overlapped by the ring member in order that there may be no axially aligned points which might be susceptible to oil leakage.

As a further feature of the invention I preferably so form the ring members and the sealing means that the former urge the latter into sealing relation.

Other objects and advantages of the invention will be more apparent from the following description taken in connection with the accompanying drawing, in which:

Fig. 1 is a longitudinal sectional view through a housing showing the improved seal therein about a rotatable shaft.

Fig. 2 is a vertical sectional view taken on the line 2—2 of Fig. 1.

Fig. 3 is a view illustrating a modified form of the seal shown in Fig. 1.

Referring to the drawing, the improved seal 10 is positioned within a housing 12 in encompassing relation to a centrally located rotatable shaft 14. The seal 10 includes an inner ring member of two sections 16 and 18 and an outer ring member of two sections 20 and 22. The adjacent faces of the ring member sections are of irregular contour as shown in Fig. 1, the aforesaid face of the ring sections 20 and 22 having an annular formed axially extending substantially V-shaped portion 24 registering with a correspondingly shaped recessed portion 26 in the opposite face of the ring sections 16 and 18. The faces of the V-shaped portion 24 are arranged in parallel relationship to the oppositely disposed faces of the sections 16 and 18, as is illustrated in Fig. 1.

Positioned between the inner and outer ring members are two yieldable packing members 28 and 30, preferably formed of leather, each of which has a correspondingly shaped radially extending flange of irregular contour, the face portions of which conform to the contour of the adjacent face portions of the respective ring members and are arranged in substantially parallel relation thereto. The outer edge portions of these radial flanges engage the inner periphery of the housing to prevent the escape of lubricant therefrom. The packings 28 and 30 also include radially extending flanges 32 and 34, respectively, the latter of which engages the shaft 14 for preventing lubricant escaping axially of the shaft.

Referring to Fig. 2, the packing 28 is severed from the outer to the inner edges as indicated at 36 and is also partially severed as indicated at 38, while the packing 30 is correspondingly severed at 40 and 42, respectively. This arrangement together with the arrangement of the sections of the ring members permits assembly and disassembly of the seal when the shaft is in its assembled position. As a further precaution in preventing leakage of fluid or lubricant through the seal, the ring members and packings are so disposed that the locations at which the packings 28 and 30 are severed as to be in non-registering relation with each other and also with the end sections of the ring members.

The inner and outer ring members and the packings 28 and 30 are provided with a plurality of circumferentially spaced axially extending registering apertures for receiving the respective securing screws 44 in threaded engagement with the ring members. At least two of the screws 44 are common to two sections of the ring members. In order to prevent passage of lubricant axially of the registering apertures aforesaid, the openings in the packing members 28 and 30 are preferably formed with a diameter slightly less than the diameter of the screws so that the walls at the openings in the packings will securely engage the peripheral surface of the screw. When the ring members are drawn toward each other against the respective adjacent faces of the packing members by the screws 44, the packings are forced radially inwardly and outwardly so that the peripheral edge of the packings and the flanges 32 and 34 are urged toward the inner surface of the housing and the shaft 14, respectively. A coil spring 48 is disposed in a recess 46 formed in the inner face of the ring sections 16 and 18 and urges the flanges 32 and 34 toward the shaft 14.

Referring to Fig. 3, there is shown a modified form of the seal including the inner and outer ring members having the sections 16', 18' and 20' and 22', respectively. Each of the inner ring member sections has an annular extending recess 26' and the outer ring member sections are provided with the axially extending substantially V-shaped portion 24' adapted to extend into the recess 26'. The packing seals 28 and 30 are extended between the opposed faces of the ring members as in Fig. 1. In this form of the invention the wall surface 50 of the projection 24' does not extend parallel with the opposed wall surface 52 of the recess and the other opposed wall surfaces of the recess 26' and projection 24' are so arranged as to be in non-parallel relation. This arrangement further increases the radial flow of the packings 28 and 30 when the ring sections are clamped together by the securing screws 44.

What I claim is:

1. As an article of manufacture, a seal adapted for application in a housing in encompassing relation to a centrally located shaft including metallic ring members each comprising a plurality of sections, a section of one of said ring members circumferentially overlapping sections of the other of said ring members, said ring members having axially opposed faces, the sections of one of said ring members having an axially extending annular projection and the sections of the other of said ring members having an annular recess opposed to said projection, yieldable sealing means comprising a radially extending flange of irregular cross sectional contour disposed between said opposed faces and an integral portion therewith engageable with said shaft, said sealing means being severed for accommodating spreading thereof, means for detachably securing said ring members and said sealing means in assembled relation, said securing means drawing said projection into said recess into engagement with the radial flange of said sealing means for progressively urging the latter radially in opposite directions toward said shaft and said housing.

2. As an article of manufacture, a seal adapted for application to a housing in encompassing relation to a centrally located shaft, including oppositely disposed ring members, a yieldable ring having a radially extending flange disposed between the opposed faces of said ring members and having an axially extending flange engageable with said shaft, one of the opposed faces having an annular V-shaped groove and the other of said faces having an annular V-shaped projection disposed axially to said groove, the side walls of said groove presenting a larger angle than the side walls of said projection for progressively pinching said packing member radially in opposite directions from the apex of said projection and groove when said ring members are brought together, and securing means for drawing said rings together.

WALTER M. BORCHARDT.